(12) United States Patent
Gopal et al.

(10) Patent No.: US 8,965,751 B2
(45) Date of Patent: Feb. 24, 2015

(54) PROVIDING MULTI-LINGUAL TRANSLATION FOR THIRD PARTY CONTENT FEED APPLICATIONS

(75) Inventors: Burra Gopal, Bellevue, WA (US); Gaurav Doshi, Seattle, WA (US); Huy Q. Nguyen, Bothell, WA (US); Ovais Khan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 12/916,892

(22) Filed: Nov. 1, 2010

(65) Prior Publication Data

US 2012/0109631 A1 May 3, 2012

(51) Int. Cl.
*G06F 17/28* (2006.01)
*G10L 15/00* (2013.01)

(52) U.S. Cl.
USPC ................................. 704/8; 704/2

(58) Field of Classification Search
CPC . G06F 17/274; G06F 17/289; G06F 17/2872; G06F 17/2836; G06F 17/2755; G06F 17/271; G06F 17/2827; G06F 9/4448; G06F 17/2785; G06F 17/2735
USPC ....................................................... 704/1–10
See application file for complete search history.

(56) References Cited

U.S. PATENT DOCUMENTS

| | | | |
|---|---|---|---|
| 6,163,785 A * | 12/2000 | Carbonell et al. ............ | 715/236 |
| 6,996,520 B2 * | 2/2006 | Levin .............................. | 704/10 |
| 7,130,792 B2 | 10/2006 | Tokieda et al. | |
| 7,177,793 B2 * | 2/2007 | Barker et al. ..................... | 704/8 |
| 7,308,399 B2 * | 12/2007 | Fallen-Bailey et al. .......... | 704/8 |
| 7,318,020 B1 * | 1/2008 | Kim .................................... | 704/2 |
| 7,610,187 B2 | 10/2009 | Jaquinta | |
| 7,636,656 B1 * | 12/2009 | Nieh ................................. | 704/2 |
| 7,640,184 B1 * | 12/2009 | Lunt .............................. | 709/217 |
| 8,126,701 B2 * | 2/2012 | Beck .................................. | 704/8 |
| 8,140,332 B2 * | 3/2012 | Itoh et al. ...................... | 704/251 |
| 2003/0171911 A1 * | 9/2003 | Fairweather ...................... | 704/2 |

(Continued)

FOREIGN PATENT DOCUMENTS

| | | |
|---|---|---|
| CN | 1324043 A | 11/2001 |
| CN | 1512395 A | 7/2004 |

(Continued)

OTHER PUBLICATIONS

Deshayes, Catherine, "Lead Galaxy makes multilingual move", Retrieved at << http://www.themovechannel.com/news/022d18e6-2e7a/ >>, Sep. 2, 2010, pp. 2.

(Continued)

*Primary Examiner* — Daniel D Abebe
(74) *Attorney, Agent, or Firm* — Tom Wong; Jim Ross; Micky Minhas

(57) ABSTRACT

Multi-lingual translation for third party content feed applications is provided in social network and similar environments in an independent manner from the content feed. A copy of a content feed may be distributed to consumers via content feed channels of a social network or similar service with language specific views. Translation is performed post-content feed based on tagged format of the content feed translating language dependent text into a selected (or detected) language for a user and leaving language independent text in its original form. Support for new languages may be added or existing languages removed independent of the content feed.

20 Claims, 6 Drawing Sheets

(56) References Cited

U.S. PATENT DOCUMENTS

| | | | |
|---|---|---|---|
| 2004/0153310 A1* | 8/2004 | Beck | 704/10 |
| 2005/0075968 A1* | 4/2005 | Apostolides | 705/38 |
| 2005/0240393 A1* | 10/2005 | Glosson | 704/8 |
| 2005/0267973 A1 | 12/2005 | Carlson et al. | |
| 2006/0156278 A1* | 7/2006 | Reager | 717/104 |
| 2006/0173829 A1 | 8/2006 | Neeman | |
| 2007/0005339 A1* | 1/2007 | Jaquinta | 704/8 |
| 2007/0124200 A1 | 5/2007 | Simons et al. | |
| 2008/0046231 A1* | 2/2008 | Laden et al. | 704/8 |
| 2008/0147378 A1* | 6/2008 | Hall | 704/4 |
| 2008/0177528 A1* | 7/2008 | Drewes | 704/2 |
| 2008/0288239 A1* | 11/2008 | Bailey et al. | 704/2 |
| 2009/0083025 A1* | 3/2009 | Hauduc et al. | 704/8 |
| 2009/0271175 A1 | 10/2009 | Bodin et al. | |
| 2010/0198581 A1* | 8/2010 | Ellis | 704/4 |
| 2011/0054881 A1* | 3/2011 | Bhalerao | 704/2 |
| 2011/0125485 A1* | 5/2011 | Prakash et al. | 704/3 |
| 2011/0282645 A1* | 11/2011 | Khuda | 704/3 |

FOREIGN PATENT DOCUMENTS

| | | |
|---|---|---|
| CN | 1602482 A | 3/2005 |
| CN | 101542474 A | 9/2009 |

OTHER PUBLICATIONS

Butcher, Mike, "mloovi—Feedburner for the rest of the planet?", Retrieved at << http://eu.techcrunch.com/2008/08/06/mloovi-feedburner-for-the-rest-of-the-planet/ >>, Aug. 6, 2008, Page1.

"New RSS feed translation service crosses language barrier", Retrieved at << http://www.prlog.org/10835380-new-rss-feed-translation-service-crosses-language-barrier.pdf >>, Aug. 3, 2010, pp. 2.

Needleman, Rafe, "How to translate RSS feeds", Retrieved at << http://news.cnet.com/8301-17939_109-9731147-2.html>>, Jun. 19, 2007, pp. 3.

Chitu, Alex, "Translate Feeds in Google Reader", Retrieved at << http://googlesystem.blogspot.com/2008/11/translate-feeds-in-google-reader.html >>, Nov. 11, 2008, Page1.

Saenz, Aaron, "Global Twitter: Tweets translated into any language", Retrieved at<< http://singularityhub.com/2010/02/03/global-twitter-tweets-translated-into-any-language/ >>, Feb. 3, 2010, pp. 7.

"'Environment.GetResourceString Method", Retrieved at << http://msdn.microsoft.com/en-us/library/system.environment.getresourcestring(VS.80).aspx >>, Sep. 16, 2010, pp. 2.

"Thread.CurrentCulture Property", Retrieved at << http://msdn.microsoft.com/en-us/library/system.threading.thread.currentculture.aspx >>, retrieved date: Sep. 16, 2010, pp. 3.

"First Office Action and Search Report Received in China Patent Application No. 201110358410.X", Mailed Date: Nov. 19, 2013, Filed Date: Oct. 31, 2011, 15 Pages.

* cited by examiner

PROVIDING MULTI-LINGUAL TRANSLATION FOR THIRD PARTY CONTENT FEED APPLICATIONS

BACKGROUND

Technological evolution continues to automate and speed manual activities. Developments in computational technologies have enabled computational systems to engage in activities previously depended on human resources. Translation activities such as internationalization, globalization, and localization are examples of processes with heavy human resource costs which computing systems automate more effectively with continued development.

Internationalization encompasses the planning and preparation stages for a product that is built to support global markets. This process removes all cultural assumptions. Country or language-specific content are stored for simplified adoption. Globalization is a cycle of processes rather than a single process. Localization is an integral part of the globalization process. To globalize is to plan the design and development methods for a product in advance, to consider a multicultural audience, and to simplify the localization effort for each region or country.

Localization is usually treated as a mere high-tech translation. Although, it is sometimes difficult to draw the differences between translation and localization, in general, localization addresses significant, non-textual components of products or services. In addition to translation, the localization process may include adapting graphics, adopting local currencies, using proper forms for dates, formatting addresses and phone numbers, picking colors, and other details. All these changes aim to recognize local sensitivities, avoid conflict with local culture and habits, and enter the local market by merging into its needs and desires. For example, localization aims to offer country specific websites of the same company, or different editions of a book.

The localization process is related to the cultural adaptation and translation of software, video games, and websites. Localization can be implemented for regions or countries where people speak different languages. Alternatively, it can be implemented for regions speaking the same language but using different dialects, different idioms, and different word choices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing multi-lingual translation for third party content feed applications in social network and similar environments. According to some embodiments, a single copy of a content feed may be distributed to consumers via content feed channels of a social network while providing on demand language specific views. Support for a new language may be added after the content feed distribution.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
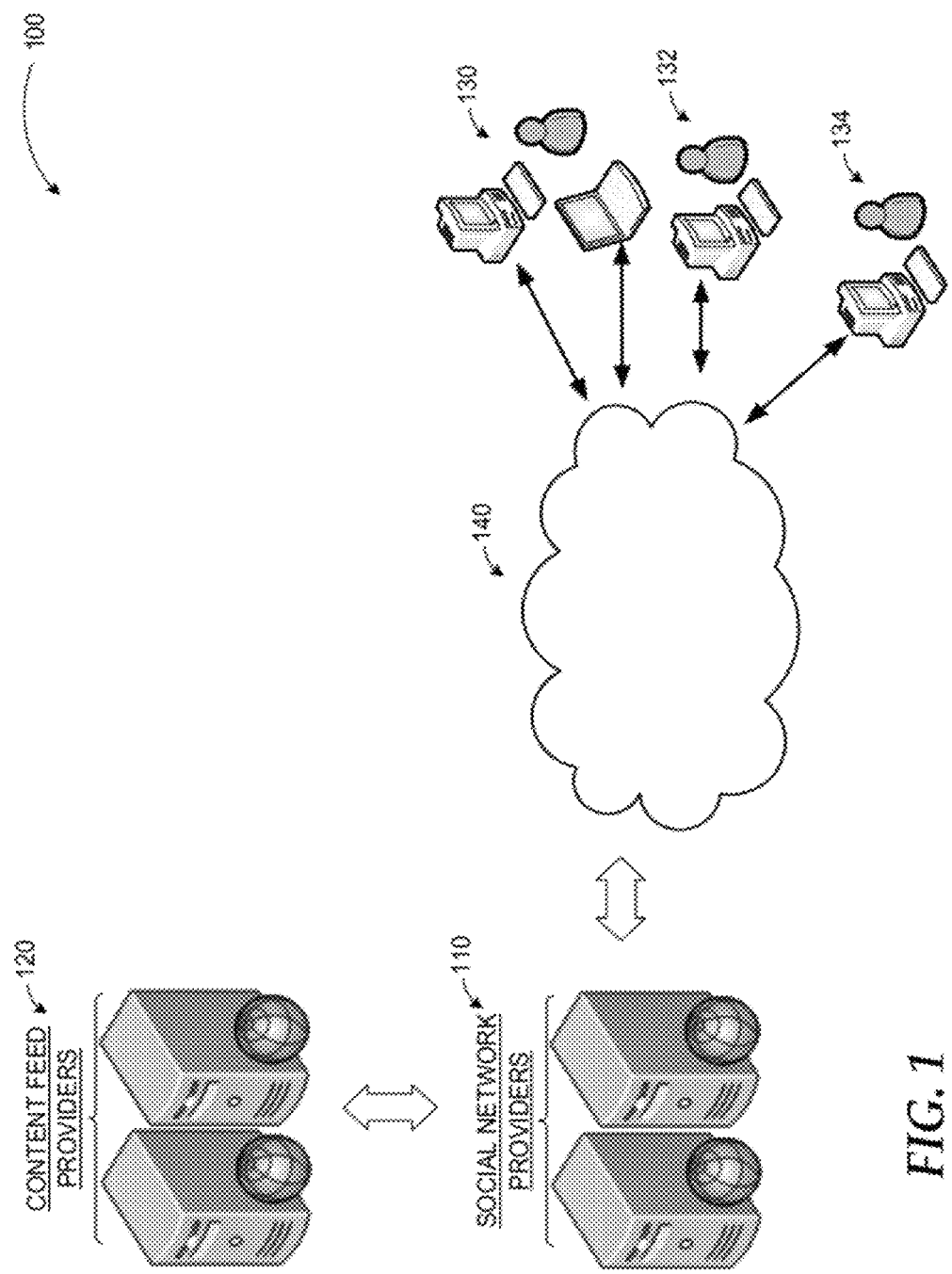
FIG. 1 is a diagram illustrating example components of a multi-lingual content feed translation system.

As briefly described above, multi-lingual translation for third party content feed applications may be provided without having to generate and distribute the content feed in different languages. A third party content feed application may register language specific formatted templates only once, and from that point on, whenever an end user requests for strings in that language, the provided template may be used for content from the third party content provider. A user's preferred language may be detected and the content feed data may be translated and transmitted to the user in the preferred language. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for providing content feed data in multiple languages in a social network or similar environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components a multi-lingual translation system. In diagram 100, the servers 110 may execute one or more social networking applications and transmit content feed data, among other information, via network 140. The network 140 may be a local network or may be an external entity such as an internet based infrastructure. It may provide wired or wireless connectivity. Network nodes may connect to each other through unsecured or secured connectivity. An example of a secured connectivity may be a Virtual Private Network (VPN) established among the network nodes with the use of encrypted communications.

The servers 110 may be associated with a social networking provider service communicating with the clients through a variety of protocols, an example of which may be the Hyper Text Transport Protocol (HTTP). The social networking provider service may also provide services to accommodate organization specific end user applications to provide content to users. An example of such services may be providing content to a user such as an acquaintance's status. Additionally, social networking providers enable a user to access services through multiple client devices (e.g. client 130) or multiple users to access the same service simultaneously (e.g. clients 132, 134).

In an embodiment, the servers 120 may be content feed providers generating one or more content feeds. The content feed providers may provide the social networking provider service with content services. An example of such services may be a weather status update. Other examples may include general information such as news, marketing reports, and comparable ones. Yet other examples may include personal information transmitted through news feed channels of social networks (or similar entities) such as personal status updates, comments, etc.

In an example scenario, content feed providers may generate the content. The content feed providers may format the content according to social networking service's specifications. The formatted content feed may be transmitted to the social networking provider service. The social networking provider service may determine a user's preferred language and translate the content for transmission to the user.

Figure 2:
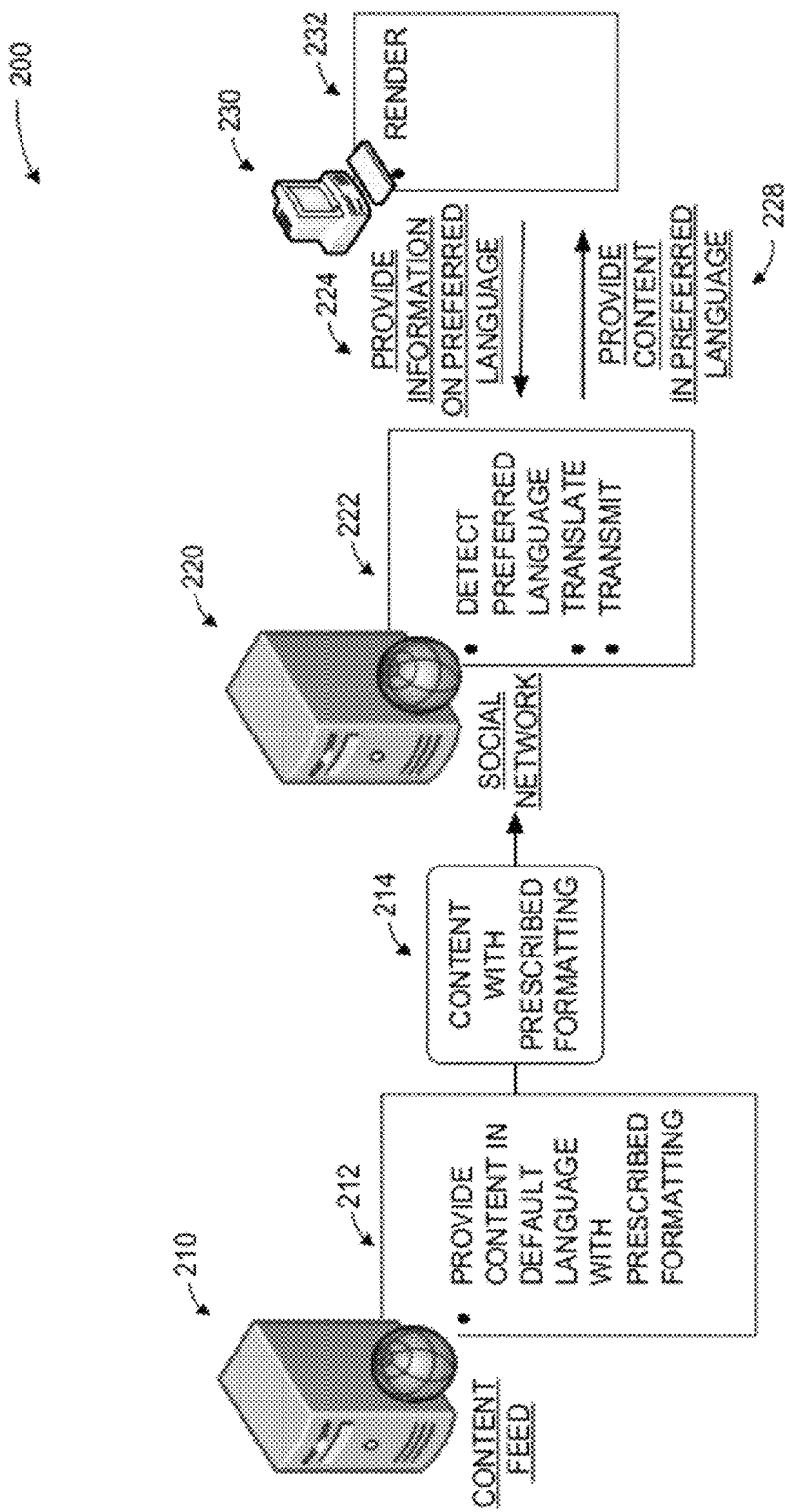
FIG. 2 illustrates example steps in providing content feed data in a preferred language.

FIG. 2 illustrates example steps in providing content feed in a preferred language. A system according to embodiments employs activity recognition to translate formatted content feed content. A social networking server may provide a client with a content feed translated in client's preferred language. According to some embodiments, content feed server may format content in a language with prescribed formatting. According to other embodiments, the social networking server may receive the formatted content. The social networking server may also receive information on the preferred language from the client. According to further embodiments, the social networking server may detect the user's preferred language, translate the formatted content feed content, and transmit the content in preferred language to the user. The client may render the translated content for display to the user.

Diagram 200 illustrates some example steps in providing content feed in a preferred language according to embodiments. Content feed server 210 may create content 212 in default language with prescribed formatting. The formatting may match the requirements of the social networking server to accept the news feed. An example of the formatted content may be a weather status update including information about weather patterns and location.

The content feed server may transmit the content with prescribed formatting 214 to the social networking server 220. The social networking server may also receive information 224 on a preferred language from the client 230. The social networking server may detect the preferred language 222 from the provided information, translate the content, and transmit the content in the preferred language 228 to the client. An example of the content in the preferred language may be a content feed about user's itinerary and a warning on weather status, formatted to display the weather information in the user's preferred language. The client may render the received content in the preferred language to display to the user. The client may be any device capable of displaying the social networking application such as a desktop computer, a laptop computer, a Personal Digital Assistant (PDA), a smartphone, a tablet, etc.

The content feed may be formatted to components based on an activity in the content feed. The activities may be classified by activity type. The activity type may be the format of an activity. The social networking server may store language specific textual activity templates. The templates may construct a meaningful phrase in a language to describe the activity. The templates may be stored in a template lookup table in a database and referred to with unique identifiers.

Each activity template may be constructed of language dependent values, independent tag value pairs, and an activity type reference. Language independent tag value pairs may be generic pairs referring to identifying parts in a phrase. An example identifying part may be a name, a link, an address, etc. Language dependent tags may be specific values that correspond to portions of the phrase to be translated. Translation may proceed by retrieving the matching activity template from the lookup table and inserting portions of the phrase in the preferred language. According to an example format, the language independent pairs may be encased in curly brackets to differentiate from language dependent values which may be encased in angle brackets.

For example, for an activity type of picture upload, the U.S. English language template may look like:

{Publisher} updated a picture {Link} of {Name}, and a translated version in German may look like:

{Publisher} hat aktualisiert ein Bild {Link} für {Name}, and a translated version in French may look like:

{Publisher} mis à jour une image {Link} pour {Name}, where {Publisher}, {Link}, and {Name} are language independent tags.

An activity event describing a content feed formatted to match an activity template may have multiple components. Some of the components may be pairs corresponding to language independent data, a reference to an activity type and a flag indicating whether the template may have multiple values.

An activity event may be generated by the content feed provider by storing language independent pairs, storing a reference to an activity template, and storing a flag indicating whether the template may have multiple values. Once the social networking server receives the activity event, it may match the activity event to the corresponding template(s) and construct a language specific string to display to the user based on the user's preferred language. Thus, in a system according to embodiments, translation of language dependent text is rendered independent from a content provider. As a result, additional translation languages may be added or existing ones removed from the system independent of the content allowing further customization of the social network service for users.

Support for a new language may be added by adding additional templates to the lookup table based on the new language. Templates may also be removed from the lookup table. Additionally, language specific tags may be altered by changing the value portion of the tag on the fly. An example application may add hypertext markup language (HTML) tags to the language dependent value to provide formatting to the translated text transmitted to the client.

Figure 3:
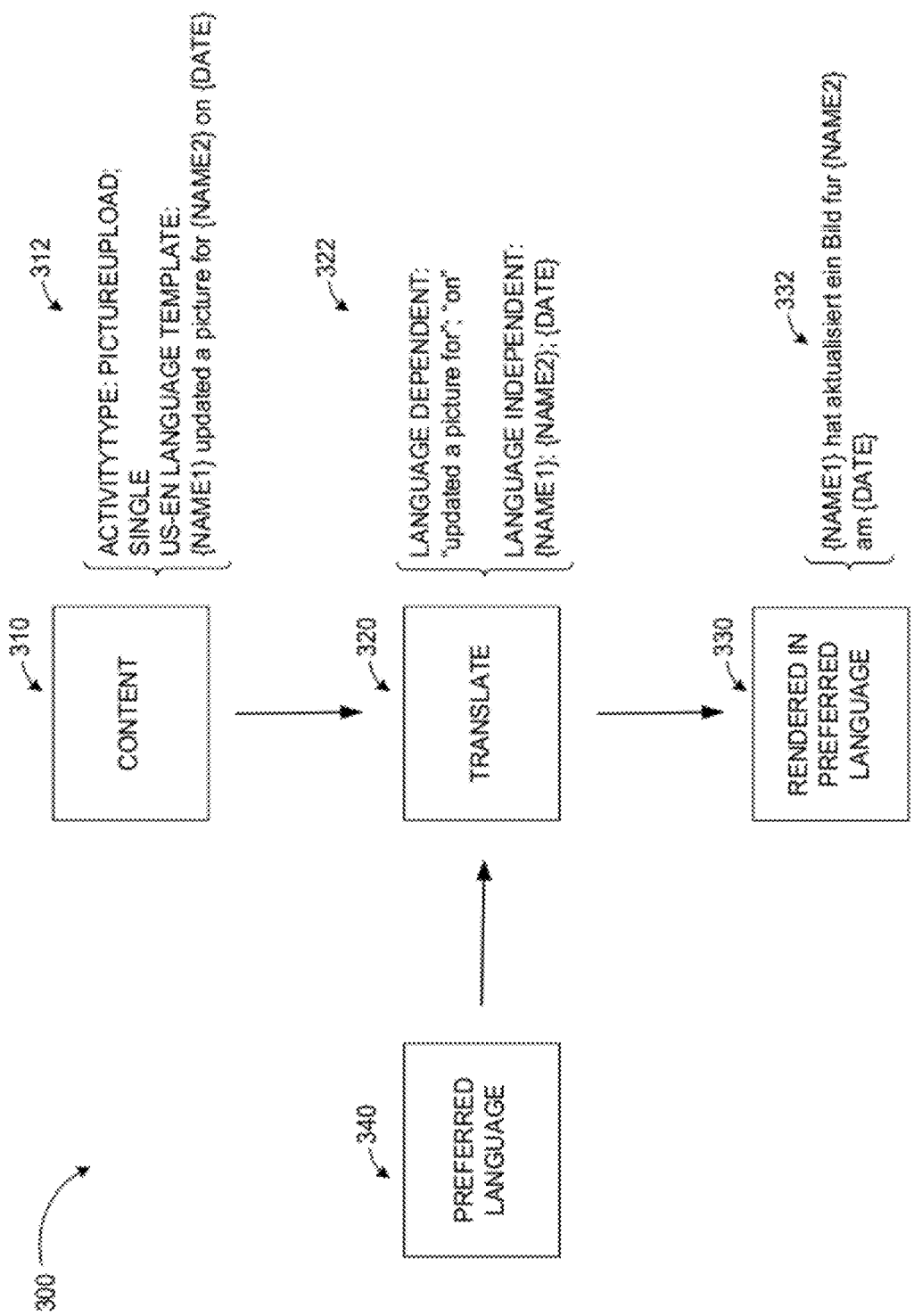
FIG. 3 illustrates an example scenario according to some embodiments.

FIG. 3 illustrates an example scenario according to some embodiments. As shown in diagram 300, a social networking server may receive a preferred language 340. The preferred language may be automatically provided by a client. An example may be a client application's language setting such as a browser application's default display language. Alternatively, a user may provide the preferred language manually by selecting a language setting in a social networking application configuration.

As shown in diagram 300, the social networking server may receive content feed 310. The content may have an activity event 312 which may have an activity type, language independent data, and a flag indicating whether the template may have multiple values. A template with multiple values may host additional tag value pairs to encompass alternative meanings of a translation. The language independent data may have tag value pairs corresponding to non-translated portions of the sentence. An example activity event may be:

```
ACTIVITYTYPE: PICTUREUPLOAD;
  SINGLE
LANGUAGE INDEPENDENT:
  {PUBLISHER} → CLEARINGHOUSE1,
  {LINK} → WWW.123TESTSITE123.COM,
  {NAME} → PERSON1;
```

The social networking server may translate 320 the content feed content by matching the template indicator in the activity event to a template in the template lookup table and the preferred language. It may retrieve the language dependent and independent tags and values 322 of the content feed. Example language dependent and independent components may be: LANGUAGE DEPENDENT: <NAME 1> UPDATED A PICTURE OF <NAME 2> ON <DATE>, where bold text is language dependent text to be translated, and <text> is language independent not-to-be translated.

The social networking server may transmit a string in the preferred language (e.g., German) to the client, which may render the translated string 330. The above listed example text as rendered string may look like:
<NAME1> HAT AKTUALISIERT EIN BILD FÜR <NAME 2> AM <DATE>.

The systems and implementations of multi-lingual translation for third party content feeds discussed above are for illustration purposes and do not constitute a limitation on embodiments. Third party content feeds may be translated employing other modules, processes, and configurations using the principles discussed herein.

Figure 4:
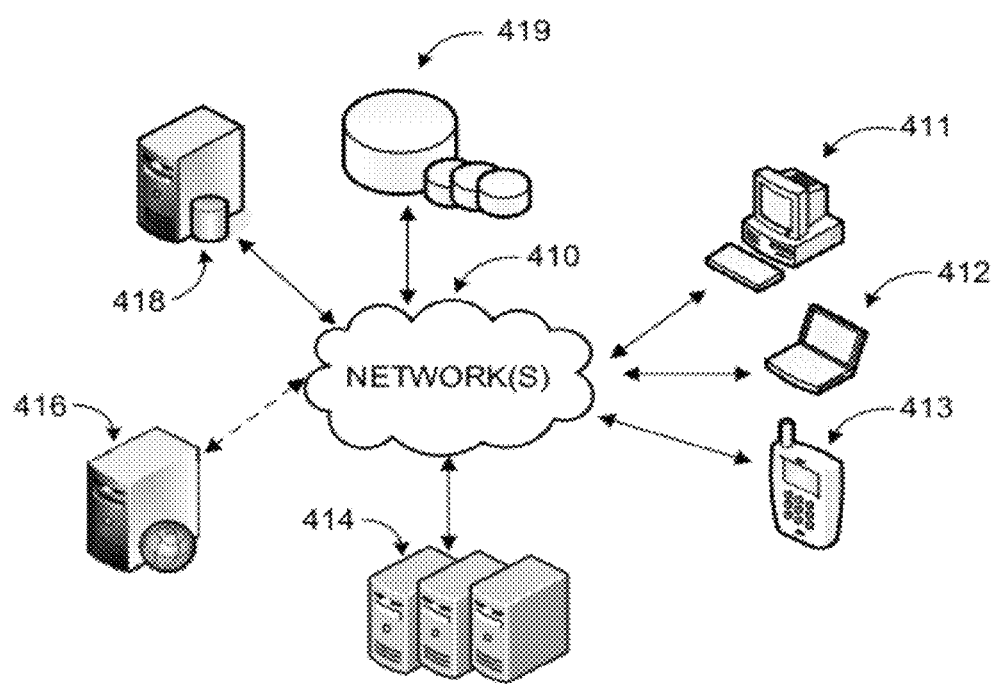
FIG. 4 is a networked environment, where a system according to embodiments may be implemented.

FIG. 4 is an example networked environment, where embodiments may be implemented. A multi-lingual third party content feed translation algorithm may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

As discussed above, a social networking server may execute the algorithm to translate a content feed from a content feed server. If the content feed server transmits an activity event, the social networking server may translate and transmit a content feed in a preferred language to the client device 411-413. Matching multiple templates may also be translated and provided as alternative translated text to the client.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to translate third party news feeds. Furthermore, the networked environments discussed in FIG. 4 are for illustration purposes only. Embodiments are not limited to the example applications, modules, or processes.

Figure 5:
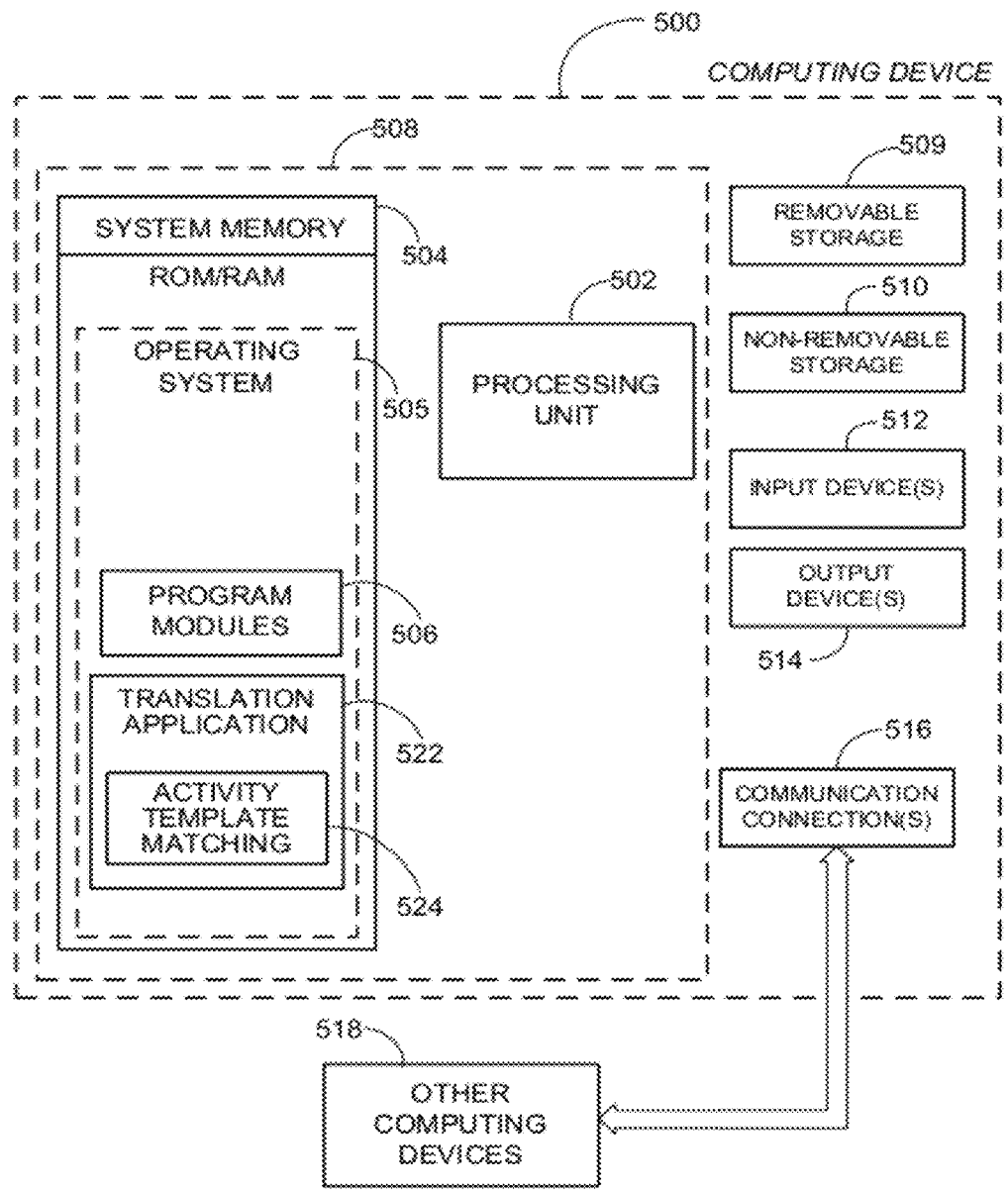
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a social networking server translating third party content feeds in a social networking environment and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, translation application 522, and activity template matching module 524.

Translation application 522 may be part of a service that provides multi-lingual translation to content such as third party news feeds, etc. Activity template matching module 524 may match formatted content feed content to templates corresponding to a preferred language translation. Language independent values from the content may be combined with language dependent values from the template to form the translation. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
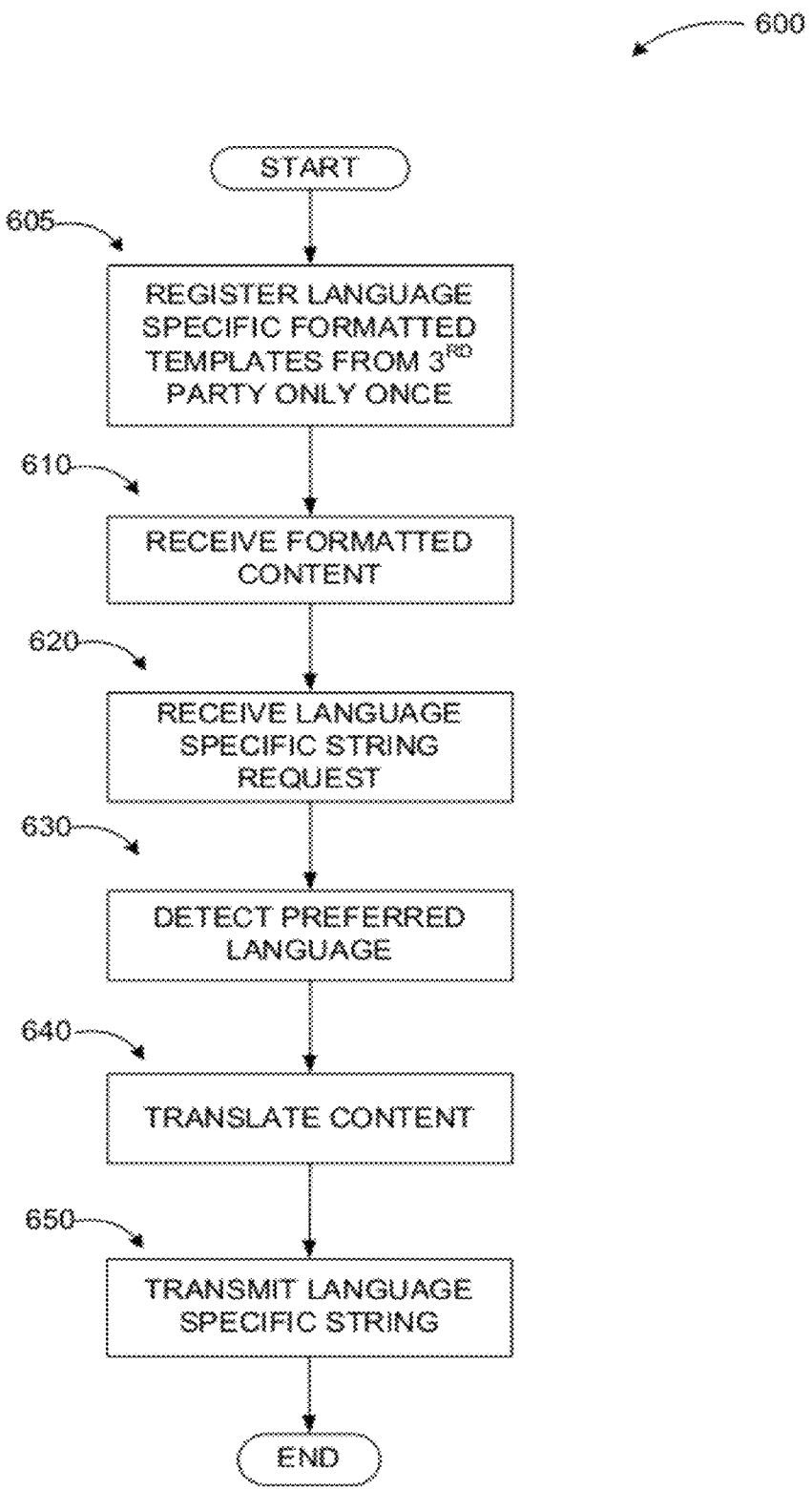
FIG. 6 illustrates a logic flow diagram for a process of providing multi-lingual translation for third party content feed applications according to embodiments.

FIG. 6 illustrates a logic flow diagram for process 600 of providing multi-lingual translation for third party content feed applications according to embodiments. Process 600 may be implemented by a server in a social networking environment providing services to clients.

Process 600 begins with operation 605, where a third party content feed provider (e.g. application) registers language specific formatted templates only once. From that point on, whenever an end user requests for strings in that language, the registered template(s) may be used. At operation 610, the server receives a formatted content from a content provider such as content feed server. The content may be an activity event which may include language independent data, reference to an activity type and a flag indicating whether the activity template may have multiple values. At operation 620 the social networking server may receive a request for a language specific string. The social networking server may detect the preferred language at operation 630 by receiving the preferred language information automatically from the client. Alternatively, a user may manually set the preferred language information in an application such as a social networking client application.

At operation 640, the social networking server may translate the content by matching the activity template reference in the activity event to a template in the lookup table. The social networking server may retrieve the matching template from the template lookup table for the preferred language. The social networking server may generate a translated string from the language independent values of the activity event and the language dependent values of the activity template. And, the social networking server may transmit the translated string to the client at operation 650.

The operations included in process 600 are for illustration purposes. Translating third party news feeds according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for translating content feed data, the method comprising:
   a processor of a social networking server receiving a formatted content having an activity event from a content feed provider;
   the processor receiving a language specific request through an input device;
   the processor determining a preferred language associated with a client device;
   the processor translating portions of the formatted content to a language specific string by matching the activity event to an activity template from an activity template lookup table, wherein alternative meanings of the translated portions are encompassed by including additional language independent tag value pairs within a multi value template; and the processor transmitting the translated language specific string to the client device.

2. The method of claim 1, wherein the activity template comprises of an activity type, at least one language independent tag, and at least one language dependent value.

3. The method of claim 1, wherein the activity event comprises at least one language independent tag, an activity type reference, and a flag.

4. The method of claim 3, wherein the flag indicates the template being one of a single value template and the multi value template.

5. The method of claim 1, wherein the preferred language is automatically determined based on a setting of the client device.

6. The method of claim 1, wherein the preferred language is manually determined based on a user selection.

7. The method of claim 1, wherein matching the activity event to an activity template further comprises:
locating the activity template having a matching activity type to an activity type reference of the activity event from the activity template lookup table.

8. The method of claim 1, wherein translating the formatted content further comprises:
if a language independent tag from the activity event matches a language independent tag from the activity template:
replacing the language independent tag from the activity template with a value of the matching language independent tag from the activity event.

9. The method of claim 1, wherein the language specific string further comprises at least one language independent value from the activity event and at least one language dependent value from the activity template.

10. The method of claim 1, wherein the client device is a browser and the translated content feed is distributed to the client device by a social network service.

11. A social networking server for translating third party content feeds, the server comprising:
a memory;
a processor coupled to the memory, the processor executing an application in conjunction with instructions stored in the memory, wherein the application is configured to:
receive a formatted content having an activity event from a content feed provider, wherein the content feed provider registers a language specific formatted template that is used for the formatted content provided;
receive a language specific string request;
determine a preferred language associated with a client;
translate the formatted content to a language specific string by matching the activity event to an activity template from an activity template lookup table;
if at least one language independent tag from the activity event matches at least one language independent tag of a language independent tag value pair from the activity template:
replace the language independent tag from the activity template with a value of the matching language independent tag from the activity event; and
transmit the language specific string to the client; and
in response to a receipt of another language specific string request in a same language, receive another formatted content from the content feed provider to translate to another language specific string, wherein the registered language specific formatted template is used for the other formatted content provided.

12. The social networking server of claim 11, wherein the activity template comprises an activity type, at least one language independent tag value pair, and at least one language dependent value to be translated into the preferred language.

13. The social networking server of claim 12, wherein the language independent tag value pair is identified within the content with a first pair of symbols encapsulating an alphanumeric value.

14. The social networking server of claim 13, wherein the language dependent value is identified within the content with a second pair of symbols different from the first pair encapsulating an alphanumeric value.

15. The social networking server of claim 11, wherein the preferred language is determined automatically by querying the client for a language setting of the client.

16. The social networking server of claim 15, wherein the client is a browser.

17. The social networking server of claim 11, wherein the social networking server is further configured to add an activity template to the activity template lookup table after receiving the formatted content and to translate by using the expanded activity template lookup table upon a new request for a language specific string.

18. A computer-readable memory device with instructions stored thereon for translating third party content feeds, the instructions comprising:
receiving a formatted content from a content feed provider having an activity event including a language independent tag value pair, a language dependent value, an activity type reference, and a flag indicating whether an activity template is a single value template or a multi value template, wherein the content feed provider registers a language specific formatted template that is used for the formatted content provided;
receiving a language specific string request from a browser;
determining a preferred language associated with a user based on a setting of the browser;
translating the formatted content to a language specific string by matching the activity event to the activity template from an activity template lookup table, wherein alternative meanings of the translated content are encompassed by including additional language independent tag value pairs within the multi value template;
if a language independent tag from the activity event matches a language independent tag from the activity template:
replacing the language independent tag from the activity template with a value of the matching language independent tag from the activity event;
translating the language dependent value in the content; and
transmitting the language specific string to a client device; and
in response to receiving another language specific string request in a same language, receiving another formatted content from the content feed provider to translate to another language specific string, wherein the registered language specific formatted template is used for the other formatted content provided.

19. The computer-readable memory device of claim 18, wherein the instructions further comprise:
locating the activity template having a matching activity type to an activity type reference of the activity event from the activity template look up table.

20. The computer-readable memory device of claim 19, wherein the activity lookup table has a capacity to expand with an addition of a new activity template and to contract with deletion of an existing activity template independent of the receipt of the content feed data.

* * * * *